(12) United States Patent
Fernandez et al.

(10) Patent No.: US 8,966,238 B2
(45) Date of Patent: Feb. 24, 2015

(54) PERSONALIZATION OF SHARED ELECTRONIC DEVICES

(71) Applicant: Apple Inc., Cupertino, CA (US)

(72) Inventors: Todd R. Fernandez, Mountain View, CA (US); Maxwell O. Drukman, San Francisco, CA (US); Christopher D. Espinosa, Menlo Park, CA (US); Andreas W. Wendker, Woodside, CA (US)

(73) Assignee: Apple Inc., Cupertino, CA (US)

( * ) Notice: Subject to any disclaimer, the term of this patent is extended or adjusted under 35 U.S.C. 154(b) by 322 days.

(21) Appl. No.: 13/631,173

(22) Filed: Sep. 28, 2012

(65) Prior Publication Data

US 2013/0238889 A1 Sep. 12, 2013

Related U.S. Application Data

(60) Provisional application No. 61/607,409, filed on Mar. 6, 2012.

(51) Int. Cl.
*G06F 1/24* (2006.01)
*G06Q 10/00* (2012.01)

(52) U.S. Cl.
CPC ..................................... *G06Q 10/30* (2013.01)
USPC ........................................... 713/100; 705/308

(58) Field of Classification Search
CPC .......... G06F 17/30; G06F 21/60; G06Q 10/30
USPC ........................................... 705/308; 713/100
See application file for complete search history.

(56) References Cited

U.S. PATENT DOCUMENTS 8,650,055 B2 * 2/2014 Davie ........................... 705/7.11
2012/0117001 A1 * 5/2012 Gventer et al. ............... 705/500

* cited by examiner

*Primary Examiner* — Albert Wang
(74) *Attorney, Agent, or Firm* — Park, Vaughan, Fleming & Dowler LLP; Anthony P. Jones

(57) ABSTRACT

The described embodiments include an electronic device that performs configuration operations. During operation, an administrative electronic device receives an indication that an electronic device that is presently checked out to a user is to be checked in. The administrative electronic device then requests a backup file with information from the electronic device, wherein the information comprises information about one or more changes made to the electronic device since the electronic device was checked out. Next, the administrative electronic device receives the backup file from the electronic device. The administrative electronic device then restores the electronic device to an initial state, wherein, in the initial state, changes made to the electronic device since the electronic device was checked out are reversed to return the electronic device to the initial state.

42 Claims, 3 Drawing Sheets

PERSONALIZATION OF SHARED ELECTRONIC DEVICES

RELATED CASES

The instant application is a non-provisional application from, and hereby claims priority under 35 U.S.C. §120 to, pending U.S. provisional application No. 61/607,409, which is entitled "Personalization of Shared Electronic Devices," by inventors Todd R. Fernandez, Maxwell O. Drukman, Christopher D. Espinosa, and Andreas W. Wendker, filed on 6 Mar. 2012, and which is incorporated by reference.

BACKGROUND

1. Field

The described embodiments relate to electronic devices. More specifically, the described embodiments relate to the configuration of electronic devices.

2. Related Art

As small form-factor electronic devices such as smartphones and tablet computers have become more widely available and more computationally powerful, users have begun imagining new types of uses for the electronic devices. For example, it is becoming more common for institutions (e.g., schools, museums, churches, etc.) and commercial enterprises (e.g., airlines, tours, bars, etc.) to provide users with such electronic devices for temporary use, allowing a user to check out an electronic device, use it, and return the electronic device.

However, security and privacy problems can arise when using the electronic devices in this way. These problems can arise because, for many of these electronic devices, data and settings on the electronic device are generally available to anyone who is using the electronic device. For example, when an electronic device such as a tablet computer is used by students in a school setting (e.g., for a chemistry lab or as a research tool in a library), documents created by the student can be available to anyone who subsequently uses the tablet computer. This problem becomes particularly apparent when groups of users will be sharing a small number of electronic devices.

SUMMARY

The described embodiments include an administrative electronic device that performs configuration operations. During operation, an administrative electronic device receives an indication that an electronic device that is presently checked out to a user is to be checked in. The administrative electronic device then requests a backup file with information from the electronic device, wherein the information comprises information about one or more changes made to the electronic device since the electronic device was checked out. Next, the administrative electronic device receives the backup file from the electronic device. The administrative electronic device then restores the electronic device to an initial state, wherein, in the initial state, changes made to the electronic device since the electronic device was checked out are reversed to return the electronic device to the initial state.

In some embodiments, the administrative electronic device stores the backup file in an entry in a user database and updates the entry to indicate that the entry holds the backup file for the user.

In some embodiments, the administrative electronic device receives an indication that an electronic device is to be checked out to the user. The administrative electronic device then checks out an electronic device in the initial state to the user, retrieves the backup file for the user from the user database, and uses the backup file to update a state of the electronic device, wherein the updated state of the electronic device comprises the changes made to the electronic device.

In some embodiments, the administrative electronic device acquires an administrator's file, wherein the administrator's file comprises one or more changes to be made to the electronic device after the electronic device is checked out. The administrative electronic device then one of: (1) uses the administrator's file update the backup file before using the backup file to update the state of the electronic device, or (2) after using the backup file to update a state of the electronic device, uses the administrator's file to re-update the state of the electronic device.

In some embodiments, the administrative electronic device receives an indication that an electronic device is to be checked out to the user when no backup file exists for the user. The administrative electronic device then checks the electronic device out to the user and uses the administrator's file to update a state of the electronic device.

In some embodiments, when using the backup file to update a state of the electronic device, the administrative electronic device determines changes present in the backup file, determines changes in the backup file that will not alter the initial state of the electronic device, creates an intermediate backup file that comprises only changes that will alter the initial state of the electronic device, and uses the intermediate backup file as the backup file when updating a state of the electronic device.

In some embodiments, when receiving the backup file from the electronic device, the administrative electronic device receives a partial backup file from the electronic device, wherein the partial backup file comprises only changes made that are different than the changes in the intermediate file. The administrative electronic device then updates the backup file with the changes from the partial backup file.

In some embodiments, upon receiving an indication that an electronic device is to be checked out to the user, but before proceeding with checking out an electronic device to the user, the administrative electronic device determines if the electronic device is an electronic device that is in a set of electronic devices that are allowed to be checked out. If so, the administrative electronic device proceeds with checking out the electronic device, retrieving the backup file, and using the backup file to update a state of the electronic device. Otherwise, the administrative electronic device generates a warning and does not proceed with checking out the electronic device, retrieving the backup file, and using the backup file to update a state of the electronic device.

In some embodiments, the administrative electronic device provides information from the backup file in the user database to one or more users for review.

In some embodiments, the one or more changes made to the electronic device since the electronic device was checked out comprise at least one of: (1) files added to the electronic device since the electronic device was checked out; (2) settings changed for the electronic device since the electronic device was checked out; and (3) applications installed on the electronic device since the electronic device was checked out.

In some embodiments, receiving an indication that an electronic device that is presently checked out to a user is to be checked in comprises: (1) receiving a connection event from a checked out electronic device; or (2) receiving an indication from a user that a checked out electronic device is to be checked in.

In some embodiments, when restoring the electronic device to an initial state, the administrative electronic device receives an indication of the initial state and uses the received indication as a template of the initial state.

BRIEF DESCRIPTION OF THE FIGURES

In the figures, like reference numerals refer to the same figure elements.

DETAILED DESCRIPTION

Figure 1:
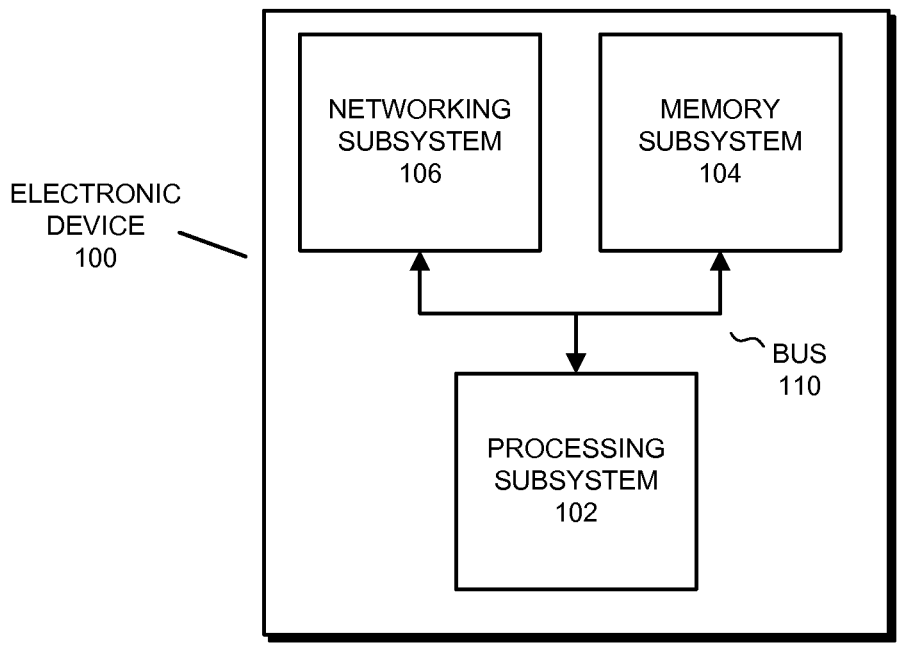
FIG. 1 presents a block diagram of an electronic device in accordance with the described embodiments.

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

The data structures and code described in this detailed description can be stored on a computer-readable storage medium. The computer-readable storage medium can include any device or medium (or combination of devices and/or mediums) that can store data structures and code for use by a computer system/electronic device. For example, the computer-readable storage medium can include volatile memory or non-volatile memory, including flash memory, random access memory (RAM, SRAM, DRAM, RDRAM, DDR/DDR2/DDR3 SDRAM, etc.), magnetic or optical storage mediums (e.g., disk drives, magnetic tape, CDs, DVDs), or other mediums capable of storing data structures or code. Note that in the described embodiments, the computer-readable storage medium does not include non-statutory computer-readable storage mediums such as transmission signals.

The methods and processes described in the following description can be embodied as program code that is stored in a computer-readable storage medium. When a computer system (see, e.g., electronic device 100 in FIG. 1) reads and executes the program code stored on the computer-readable storage medium, the computer system performs the methods and processes in the program code stored in the computer-readable storage medium.

The methods and processes described in the following description can be included in hardware modules. For example, the hardware modules can include, but are not limited to, processors, application-specific integrated circuit (ASIC) chips, field-programmable gate arrays (FPGAs), and other devices. When the hardware modules are activated, the hardware modules perform the methods and processes included within the hardware modules. In some embodiments, the hardware modules include one or more general-purpose circuits that can be configured (e.g., by executing instructions) to perform the methods and processes. For example, in some embodiments, processing subsystem 102 (see FIG. 1) can acquire instructions from memory subsystem 104 and execute the instructions to cause processing subsystem 102 to perform the processes and operations in the described embodiments.

Overview

In the described embodiments, a set of electronic devices can be shared by many different groups of users. Although information such as documents, applications, media files, and settings on each of the electronic devices are generally available to anyone who is using the electronic device, the described embodiments provide the users with security and privacy by enabling the users to check out one of the electronic devices in an initial state, use the electronic device, and then restore the electronic device to the initial state as the electronic device is checked back in when the user is finished using the electronic device. For example, students in a class in a school can check out a tablet computer in an initial state, change settings and/or passwords on the electronic device to personalize the electronic device, create/download documents/media on the electronic device while doing work for a class, and then check the electronic device back in, at which point the electronic device can be restored to the initial state. Restoring the electronic device to the initial state can remove all the changes that the student made to the initial state of the electronic device, thereby ensuring security and privacy for the student.

In the described embodiments, as part of the process of restoring the electronic device to the initial state when the electronic device is checked in, a back-up operation is performed during which the electronic device creates a backup file that includes information such as changes that the user has made to the settings and/or passwords of the electronic device, files (e.g., documents/media) that the user has placed (downloaded, created, etc.) on the electronic device, and other information from the electronic device (installed/updated applications, etc.). The electronic device can then upload the backup file to an administrative electronic device, where the backup file is stored in a database.

In the described embodiments, when checking out an electronic device to a user, if the user has a backup file available in the database, the backup file can be downloaded to the electronic device from the administrative electronic device and the electronic device can use the backup file to update the electronic device from the initial state to a state of an electronic device that the user last checked in. This can include restoring the user's settings and/or passwords to the electronic device, replacing the user's files (e.g., documents/media) on the electronic device, and restoring the other information to the electronic device (installing/updating applications, etc.). In this way, any number of users may have used an electronic device between a first time and a second time that the user uses the electronic device, but the electronic device will appear to the user to be the same electronic device that was previously used and then checked in.

In the described embodiments, because a user's backup file can be used to configure a checked-out electronic device, electronic devices can be interchangeable. Thus, given two similar electronic devices, a user can check-out, use, and then check in the first electronic device, which causes a backup file to be saved from the first electronic device. When the user subsequently checks out the second electronic device and uses the backup file to configure the second electronic device, the first and second electronic devices will be indistinguishable to the user (because the electronic devices will have matching documents, settings/passwords, applications, etc.). However, when the user does not have a backup file to download to the electronic device, a checked-out electronic device can be in the initial state and can outwardly appear identical to the other electronic devices that are still in the initial state (i.e., to which a user's backup file has not yet been restored).

In the described embodiments, information can be acquired from the backup file in the database by a user of the administrative electronic device. For instance, using the example above where the backup file was created by an electronic device that was being used by a student, a teacher can acquire documents/media files from the backup file for a student, and can use the acquired documents/media files in grading a student for a class.

In the described embodiments, the administrator can establish the initial state for the electronic devices. For example, the administrator can determine initial settings for the electronic device, can designate files (documents/media, etc.) that are to be placed on the electronic device in the initial state, can designate the applications that are available on the electronic device in the initial state, and can otherwise configure the initial state of the electronic devices. For example, a teacher in a chemistry class can determine initial settings for an electronic device, can put lab papers and materials on the electronic device, and/or can install relevant applications on the electronic device.

In some embodiments, an administrator can use an administrator's file that is similar to the backup file to enable the establishment of the initial state for the electronic devices. In some embodiments, the administrator's file is downloaded to the electronic device first and the electronic device can use the administrator's file to establish the initial state of the electronic device. In alternative embodiments, the administrator's file can be used to update/modify backup files for users before the backup files are used to configure an assigned electronic device.

In some embodiments, the electronic device and/or the administrative electronic device can execute applications that enable the operations to be performed. For example, the administrative electronic device can execute an application that presents a graphical user interface to a user via a display on the administrative electronic device that enables an administrator to review available electronic devices and users, assign electronic devices to users during the check-out process, manually or automatically check electronic devices in, review information from the backup files, and/or perform other operations as described herein. As another example, the electronic device can include an application (perhaps a low-level application without a user interface) that detects when a backup file has been requested by the administrative electronic device and provides the backup file to the administrative electronic device via a network connection, receives a backup file, extracts components from the backup file, and uses the components to configure the electronic device, receives a command to restore an initial state on the electronic device (e.g., from the administrative electronic device) and restores the initial state, and/or performs other operations as described herein.

Electronic Device

FIG. 1 presents a block diagram of electronic device 100 in accordance with the described embodiments. Electronic device 100 includes processing subsystem 102, memory subsystem 104, and networking subsystem 106.

Processing subsystem 102 can include one or more devices configured to perform computational operations. For example, processing subsystem 102 can include, but is not limited to, one or more microprocessors, ASICs, microcontrollers, or programmable-logic devices.

Memory subsystem 104 can include one or more devices for storing data and/or instructions for processing subsystem 102 and networking subsystem 106. For example, memory subsystem 104 can include DRAM, flash memory, and/or other types of memory. In addition, memory subsystem 104 can include mechanisms for controlling access to the memory. In some embodiments, memory subsystem 104 includes a memory hierarchy that includes an arrangement of one or more caches coupled to a memory for electronic device 100. In some of these embodiments, one or more of the caches is located in processing subsystem 102.

In some embodiments, memory subsystem 104 is coupled to one or more high-capacity mass-storage devices (not shown). For example, memory subsystem 104 can be coupled to a magnetic or optical drive, a solid-state drive, or another type of mass-storage device. In these embodiments, memory subsystem 104 can be used by electronic device 100 as fast-access storage for often-used data, while the mass-storage device is used to store less frequently used data.

Networking subsystem 106 can include one or more devices configured to couple to and communicate on a wired and/or wireless network (i.e., to perform network operations). For example, networking subsystem 106 can include, but is not limited to, a Bluetooth networking system (including support for the BTLE standard), a cellular networking system (e.g., a 3G/4G network), a universal serial bus (USB) networking system, a networking system based on the standards described in Institute for Electrical and Electronic Engineers (IEEE) 802.11 (i.e., an 802.11 wireless network), an Ethernet networking system, or a wired or wireless personal-area networking (PAN) system (e.g., an infrared data association (IrDA), ultra-wideband (UWB), Z-Wave, or a network based on the standards described in IEEE 802.15).

Networking subsystem 106 can include controllers, radios/antennas for wireless network connections, sockets/plugs for hard-wired electrical connections, and/or other devices used for coupling to, communicating on, and handling data and events on a wired and/or wireless network. In some of these embodiments, networking subsystem 106 can include one or more mechanisms for forming an ad hoc network connection with other devices. In the following description, we refer to a subset of the mechanisms used for coupling to, communicating on, and handling data and events on the network at the physical layer of each network connection collectively as the "interface" for the corresponding network connection.

Within electronic device 100, processing subsystem 102, memory subsystem 104, and networking subsystem 106 are coupled together using bus 110. Bus 110 is an electrical connection that processing subsystem 102, memory subsystem 104, and networking subsystem 106 use to communicate commands and data to each other. Although only one bus 110 is shown for clarity, different embodiments can include a different number or configuration of electrical connections between the subsystems.

Electronic device 100 can be, or can be incorporated into, many different types of electronic devices. For example, electronic device 100 can be a media player, an appliance, a subnotebook/netbook, a tablet computer, a smart phone, a piece of testing equipment, a network appliance, a set-top box, a personal digital assistant (PDA), a toy, a controller, a desktop computer, a laptop computer, a server, a kiosk, and/or another device.

Although specific components are used to describe electronic device 100, in alternative embodiments, different components and/or subsystems may be present in electronic device 100. For example, electronic device 100 may include one or more additional processing subsystems 102, memory subsystems 104, and/or networking subsystems 106. Alternatively, one or more of the subsystems may not be present in electronic device 100. Moreover, although separate subsystems are shown in FIG. 1, in some embodiments, some or all of a given subsystem can be integrated into one or more of the other subsystems in electronic device 100.

In some embodiments, electronic device 100 may include one or more additional subsystems that are not shown in FIG. 1. For example, electronic device 100 can include, but is not limited to, a display subsystem for displaying information on a display, a data collection subsystem, an audio subsystem, an alarm subsystem, a media processing subsystem, and/or an input/output (I/O) subsystem.

Figure 2:
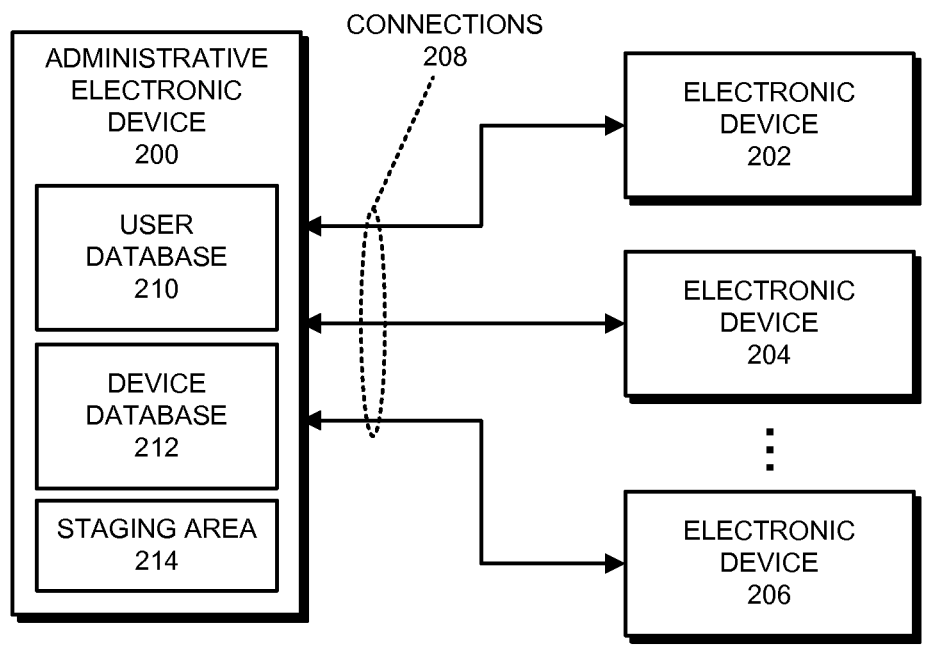
FIG. 2 presents a block diagram illustrating an administrative electronic device coupled to several electronic devices in accordance with the described embodiments.

FIG. 2 presents a block diagram illustrating an administrative electronic device 200 coupled to electronic devices 202-206 in accordance with the described embodiments. For the purpose of description, it is assumed that administrative electronic device 200 and electronic devices 202-206 are electronic devices such as electronic device 100 in FIG. 1. Thus, administrative electronic device 200 and electronic devices 202-206 include at least the subsystems shown in FIG. 1. However, alternative embodiments can use an administrative electronic device 200 and/or electronic devices 202-206 with different arrangements of subsystems. Generally, the described embodiments are operative with any electronic device that can perform the functions herein described.

In some embodiments, administrative electronic device 200 is a desktop computer, a laptop computer, a server computer, a kiosk, or another electronic device. In these embodiments, electronic devices 202-206 are smaller form-factor electronic devices such as tablet computers, netbooks, smart phones, or other small form-factor electronic devices. In these embodiments, administrative electronic device 200 may have more processing power and memory than electronic devices 202-206. Additionally, electronic devices 202-206 are all of the same type of device, and are of the type of device where information (e.g., documents, media files, and settings) on electronic devices 202-206 are generally available to anyone who is using electronic devices 202-206.

In some embodiments, administrative electronic device 200 can be an electronic device of a similar type to electronic device 202-206 (e.g., administrative electronic device 200 and electronic devices 202-206 can all be smart phones or tablet computers), although administrative electronic device 200 can be configured to perform the operations herein described.

Although electronic devices 202-206 are described as the same type of devices in this example, electronic devices 202-206 are not required to be the same type of devices. However, regardless as to whether electronic devices 202-206 are the same type of devices or not, in order to support the interchangeability of the electronic devices, any of electronic devices 202-206 should be able to be configured using a backup file from any of the other electronic devices 202-206.

As can be seen in FIG. 2, administrative electronic device 200 is coupled to electronic devices 202-206 through connections 208. Connections 208 can include any form of connection that enables administrative electronic device 200 to exchange communications (data signals, control signals, etc.) with electronic devices 202-206. For example, connections 208 can include wired connections such as universal serial bus (USB), Firewire, Ethernet, etc., and/or wireless connections such as Bluetooth, WiFi, etc. Connections 208 include three individual connections to each of electronic devices 202-206. These connections may all be the same type of connection (e.g., USB or WiFi), but are not required to be so; in some embodiments, one or more of the connections is of a different type than the other connections.

User database 210 in administrative electronic device 200 is a database of users that is stored in the memory hierarchy in administrative electronic device 200. In the described embodiments, user database 210 can include information about users such as names, identification numbers, photographs of the users, etc. Users can be added to user database 210 in a number of different ways. For example, an administrator can manually enter user information into the database, user information can be acquired or downloaded from another location/database/document, etc. In some embodiments, using an application on administrative electronic device 200, an administrator can select a group of users from user database 210 to which electronic devices 202-206 are to be assigned as part of a check-out operation.

User database 210 can also include user-specific backup files. More specifically, user database 210 includes a set of entries (not shown), each of which can hold information about a user, one or more backup files that were created for the user on a one or more types of electronic devices, and possibly additional information, e.g., the type of electronic device on which each backup file was created, the time at which each backup file was created, etc. A backup file in user database 210 can be created (or updated) when a user checks in one of electronic devices 202-206 during a check-in operation. The backup file can then be used to configure electronic devices 202-206 for the associated user during a check-out operation.

Device database 212 in administrative electronic device 200 is a database of electronic devices (e.g., electronic devices 202-206) that is stored in the memory hierarchy in administrative electronic device 200. Device database 212 includes a number of entries (not shown), each of which can include information about an electronic device that is known to administrative electronic device 200. For example, this information can include one or more device identifiers (MAC address, device unique identifier, device name, etc.), information about hardware in the device (e.g., a type of processor, a memory capacity, a display type, etc.), information about software on the device (e.g., an operating system on the device, applications available on the device, etc.), a time when the device was last checked in or checked out, a current availability of the device (e.g., whether or not the device presently connected to administrative electronic device 200), and/or other information about the device. In the described embodiments, upon receiving a request from an administrator for a set of electronic devices to be assigned to users, administrative electronic device 200 can use device database 212 to determine appropriate electronic devices that are available for assignment. In some embodiments, the administrator can request electronic devices with particular hardware and/or software, and the information in device database 212 can be used to satisfy the request.

In some embodiments, administrative electronic device 200 includes optional staging area 214. In these embodiments, when an electronic device is checked out for a user, the user's backup file (it is assumed that one is available) is copied from user database 210 to staging area 214. The backup file in staging area 214 is then analyzed to determine the differences between the electronic device in the initial state and how the electronic device will appear after the backup has been used to configure the electronic device. An intermediate backup file can then be created that includes only the differences, and the intermediate backup file can be what is sent to the electronic device to be used to configure the electronic device (note that the intermediate backup file may itself be organized as a backup file, i.e., in the same format as the backup file).

In addition, when an electronic device is checked in, the electronic device can send a partial backup file that is limited to the changes made to the electronic device. More specifically, the electronic device can analyze the intermediate backup file (which can be stored on the electronic device) to determine items to be added to a partial backup file, and the partial backup file sent from the electronic device can be buffered in staging area 214. The partial backup file can then be used to update the user's backup file in staging area 214 before the backup file is stored in user database 210. Using staging area 214 in this way can enable the administrative electronic device 200 to avoid sending unnecessarily large (full) backup files (unless sending the full backup file is necessary to configure the electronic device).

In the described embodiments, administrative electronic device 200 is configured to perform check-in and check-out operations for electronic devices 202-206. During the check-in operation, administrative electronic device 200 can capture user-specific information (documents, media, files, settings, passwords, applications, etc.) from electronic devices 202-206 in one or more backup files that can be stored in user database 210, and administrative electronic device 200 can then restore the electronic devices 202-206 to an initial state. During the check-out operation, administrative electronic device 200 can assign each user in a set of users one of electronic devices 202-206. As part of assigning electronic devices 202-206 to the users during the check-out operation, a backup file for the user from user database 210 can be used to configure the electronic device in the same configuration as the electronic device that the user last checked in.

In some embodiments, user database 210 (or another location in the memory hierarchy) can hold an administrator's file. Administrative electronic device 200 can use an administrator's file when configuring the electronic device during the check-out operation. The administrator's file can include documents, settings, applications, etc. that the administrator wants at least some of the electronic devices configured with in addition to or instead of documents, settings, applications, etc. in a backup file for the user. For example, if the electronic devices are going to be used in a class in school, the administrator can cause an updated version of a document to be placed on the electronic devices instead of a previous document in users' backup files.

In some embodiments, the administrator's file is used to update each relevant backup file with the desired information as the backup file is held in the user database 210. In other words, in these embodiments, the administrator's file is not communicated to the electronic devices, but is instead used to update individual backup files in user database 210. However, in alternative embodiments, the administrator's file can be separately communicated to an electronic device to be used in configuring the electronic device. Note that, when there is no backup file for a given user, the administrator's file may be the only file used in configuring the electronic device for the user.

In some embodiments, the administrator can use the administrator's file (or another form of backup file) to put the electronic device in the initial state. Alternatively, when the electronic device is put in the initial state, the electronic device can simply be restored to factory settings.

Applications for Performing the Check-In and Check-Out Operations

In some embodiments, administrative electronic device 200 includes an application that is executed by administrative electronic device 200 to perform operations related to the check-in and check-out of electronic devices (e.g., electronic devices 202-206). Generally, the application on administrative electronic device 200 can enable an administrator (or another user) to define, control, and monitor/review the operations performed by administrative electronic device 200 during the check-in and check-out operations herein described. For example, in these embodiments, the application can include one or more components for: (1) communicating with an operating system on administrative electronic device 200 for low-level operations such as detecting electronic devices, communicating with electronic devices, and handling events; (2) establishing and using device database 212, user database 210, and/or staging area 214; (3) presenting a user interface to users to enable the users to control the check-in and check-out operations and to review contents of backup files; and/or (4) performing other operations herein described. In some embodiments, some or all of at least some of the components reside in other applications in administrative electronic device 200, but are used by the application.

In addition, in some embodiments, each electronic device (e.g., from electronic devices 202-206) includes an application that is executed by the electronic device to perform operations related to the check-in and check-out of the electronic device herein described. As with the administrative electronic device 200, the application in the electronic device can include a number of components for performing these operations. However, in some embodiments, in the electronic devices, the application may be lower-level application (i.e., may be an automated daemon in the electronic device), and may not present an interface to the user.

Device Connection and Database Entry Update

In the described embodiments, administrative electronic device 200 can be configured so that when an electronic device 202-206 is connected to the administrative electronic device 200, administrative electronic device 200 can perform operations to determine the nature and state of the electronic device. For example, administrative electronic device 200 can request (or otherwise acquire) a device identifier. The device identifier can then be compared to entries in device database 212 to determine if the electronic device is a known electronic device. If the electronic device is a known electronic device, an entry in device database 212 can be updated to indicate that the electronic device is connected. If the electronic device is unknown, an entry in device database 212 can be updated with the device identifier and other information about the electronic device (hardware/software in the electronic device, etc.), including an indication that the electronic device is connected. As part of the process of updating the record, administrative electronic device 200 may request (or otherwise acquire) the information from the electronic device.

In some embodiments, the application executed by administrative electronic device 200 can register with an operating system to be informed of device connection events. For example, when an electronic device connects via USB, the corresponding daemon can receive a communication from the kernel that the electronic device has connected, and can inform the application. The application can then perform the above-described operations to add the electronic device to device database 212 and/or can otherwise handle the connection event (including potentially checking-in a known electronic device). Thus, the application can manage device database 212.

Performing a Check-In Operation

Figure 3:
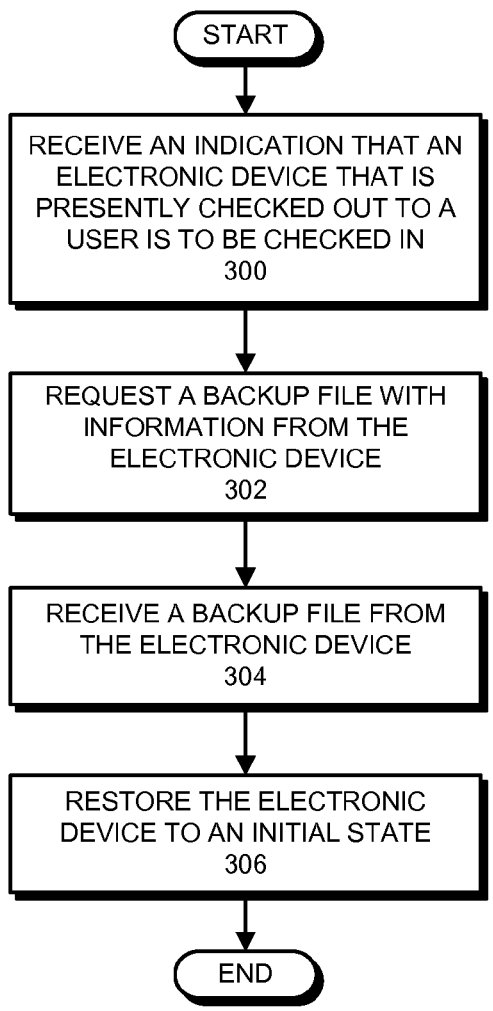
FIG. 3 presents a flowchart illustrating a process for performing a check-in operation in accordance with the described embodiments.

FIG. 3 presents a flowchart illustrating a process for performing a check-in operation in accordance with the described embodiments. For the example in FIG. 3, it is assumed that an electronic device (e.g., one of electronic devices 202-206) has been checked out to a user using, e.g., the process described above and shown in FIG. 4. As described above, the user can have made changes to the electronic device since checking the electronic device out, including adding files (documents, media files, etc.) to the electronic device, changing settings for the electronic device (volume, brightness, application settings, system settings, passwords, etc.), installing or updating applications on the electronic device, etc. For privacy and security, administrative electronic device 200 in the described embodiments can copy a backup file from the electronic device and restore the electronic device to an initial state, thereby removing the user's changes from the electronic device. The backup file can subsequently be used to configure the electronic device (or another similar electronic device) with the user's changes.

Note that the check-in operation is described in FIG. 3 using a single electronic device/user for clarity, however, in some embodiments multiple users can have electronic devices checked in with only one indication that electronic devices are to be checked in for multiple users. Generally, given N electronic devices, the described embodiments can check in all N electronic devices. For example, in some embodiments, multiple electronic devices may first be connected (e.g., via USB or WiFi) to administrative electronic device 200, and then a single "check-in" command can cause the electronic devices to be checked in.

The process shown in FIG. 3 starts when administrative electronic device 200 receives an indication that an electronic device that is presently checked out to a user is to be checked in (step 300). For example, administrative electronic device 200 can receive a manually-entered indication from an administrator using the application executed by on administrative electronic device 200 (e.g., the administrator can click a "check-in" button in the application) that the electronic device is to be checked in. As another example, the electronic device that is to be checked in can be plugged into a wired connection to administrative electronic device 200, causing an operating system in administrative electronic device 200 to generate a signal that a device connection has occurred (and the signal is interpreted as the indication). As yet another example, the user can press a button on the electronic device or enter a check-in command into an application running on the electronic device. The electronic device can then signal administrative electronic device 200 that it is to be checked in.

Administrative electronic device 200 then sends a command to the electronic device to request a backup file from the electronic device with information from the electronic device (step 302). For example, administrative electronic device 200 can send the command using a connection 208 to the electronic device. The backup file includes information about one or more changes (described above) made to the electronic device since the electronic device was checked out, and is in a format known to both the administrative electronic device 200 and the electronic device. Note that connection 208 can be a wired network connection, such as a USB connection, or a wireless network connection, such as a WiFi connection. Generally, the format of the data (i.e., both the command from the administrative electronic device and the backup file from the electronic device) as the data is transferred across the connection 208 complies with the applicable networking standard.

Upon receiving the command, an application (or an operating system or a daemon) on the electronic device can generate/assemble the backup file from the changes (described above) made to the electronic device since the electronic device was checked out. The backup file can then be communicated from the electronic device to administrative electronic device 200 using, e.g., the connection 208 between the electronic device and administrative electronic device 200.

Note that, in some embodiments, the backup file comprises several individual backup files, one for each type of change (e.g., one for settings, one for files, etc.), but an embodiment that uses only one backup file is described for clarity. Embodiments with multiple backup files function similarly—with the exception that multiple backup files may be generated/used in the check-in and check-out operations.

Administrative electronic device 200 then receives the backup file from the electronic device (step 304). In the described embodiments, the backup file is sent from the electronic device to administrative electronic device 200 across a connection 208. Upon receiving the backup file, administrative electronic device 200 can store the backup file in an entry in a user database 210. This can include updating the entry in user database 210 to indicate that the entry holds the backup file for the user. For example, a timestamp for the entry can be updated, a valid flag for the entry can be set, etc.

Administrative electronic device 200 can then restore the electronic device to an initial state (step 306). The restoration can be, for example, a restore to factory settings. As another example, the restore can be to a template file provided by an administrator (or another party), such as an administrator's file. In some embodiments, only the changes are removed from the electronic device, which can be faster than a full reset.

In some embodiments, one or more verification operations can be performed to ensure that the electronic device is restored to an initial state. For example, administrative electronic device 200 can query the electronic device to determine if a sample of electronic device settings have been restored to the initial state, if documents have been deleted from the electronic device, and/or if installed applications are in an initial state. In some embodiments, the backup file can be analyzed to determine the settings, documents, and/or applications that are checked to ensure that the electronic device is in the initial state. For example, administrative electronic device 200 can read the backup file to determine user documents that should no longer be on the electronic device and then can query the electronic device to ensure that the documents are deleted from the electronic device.

Performing a Check-Out Operation

Figure 4:
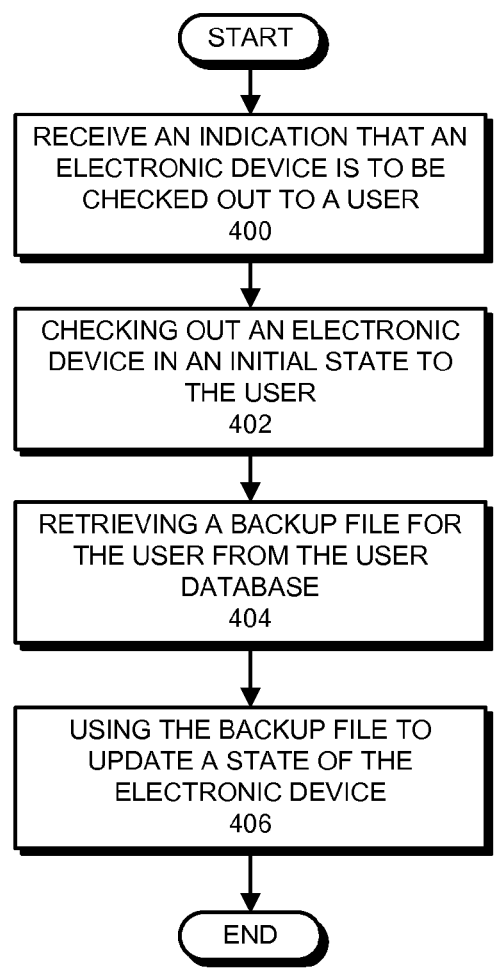
FIG. 4 presents a flowchart illustrating a process for performing a check-out operation in accordance with the described embodiments.

FIG. 4 presents a flowchart illustrating a process for performing a check-out operation in accordance with the described embodiments. For the example in FIG. 4, it is assumed that an electronic device (e.g., one of electronic devices 202-206) is connected to administrative electronic device 200 (so that it appears in device database 212), and that the electronic device is in the initial state. The electronic device can be in the initial state because it is a new electronic device (i.e., an electronic device with factory settings or for which an administrator's file has been used to configure the electronic device in the initial state), or because it has previously been used, but has been restored to the initial state (e.g., using the check-in process shown in FIG. 3). It is further assumed that an exemplary user is listed/has an entry in user database 210 and that the user has a backup file available.

Note that the check-out operation is described in FIG. 4 using a single user for clarity, however, in some embodiments multiple users can have electronic devices checked out to them with only one indication that electronic devices are to be checked out to multiple users. Generally, given N electronic devices and M users with N>M, the described embodiments can check out electronic devices to all M users. When N<M, the system can check out electronic devices to N users (assuming one user per electronic device).

As shown in FIG. 4, when performing the check-out operation, administrative electronic device 200 first receives an indication that an electronic device is to be checked out to a user (step 400). For example, administrative electronic device 200 can receive a manually-entered indication from an administrator using the application on administrative electronic device 200 (e.g., the administrator can click a "check-out" button in the application) that an available electronic device is to be checked out to the user. In some embodiments, the administrator further indicates the user that the electronic device is to be checked out to, e.g., by selecting the user from a listing of users in user database 210 in a GUI in the application. Alternatively, administrative electronic device 200 can receive an indication from the electronic device that it is to be checked out (e.g., a user or an administrator can press a button on the electronic device) and can prompt an administrator for a user to which the device is to be checked out.

Administrative electronic device 200 then checks out an electronic device in the initial state to the user (step 402). As part of checking out the electronic device to the user, administrative electronic device 200 determines which of a set of available electronic devices is to be checked-out/assigned to the user, which can include using any pattern, such as random, first-in-first-out (FIFO), etc. for selecting the electronic device. In some embodiments, user database 210 comprises a record of one or more electronic devices (e.g., a device name, MAC address, unique identifier, etc.) that the user had previously checked out (and checked back in). When the user is to be checked out an electronic device, administrative electronic device 200 can check this record and can again check out an electronic device that was previously checked out to a user.

Determining the electronic device that is to be checked-out to the user can comprise sub-operations such as ensuring that a backup file for the user in user database 210 is compatible with the electronic device, and performing other operations to determine that administrative electronic device 200 has permission to assign the electronic device and update a state of the electronic device using the user's backup file. In addition, when checking out the electronic device to the user, administrative electronic device 200 can update user database 210 and/or device database 212 to indicate that an electronic device has been checked out to the user.

Administrative electronic device 200 then retrieves a backup file for the user from user database 210 (step 404). Recall that the backup file for the user was created during a previous check-in operation (or can be manually created using an administrator's file, etc.), and that the backup file comprises changes to be made to the electronic device to configure the electronic device so that the electronic device appears to the user the same as a last checked-in electronic device. For example, so that settings and/or passwords on the electronic device, files on the electronic device, applications on the electronic device, and/or other aspects of the electronic device are adjusted to appear the same as the last checked-in electronic device.

Administrative electronic device 200 then uses the backup file to update a state of the electronic device (step 406). More specifically, administrative electronic device 200 communicates the backup file to the assigned electronic device using a connection 208. An application, daemon, and/or operating system on the electronic device can then use information in the backup file to configure the electronic device in an operational state the same as the electronic device from which the backup file was created.

Following step 406, the electronic device is in an operational state in which the user can use the electronic device without noticing differences in the settings, files, applications, etc. between a last checked in electronic device and the checked-out electronic device. For example, a visual appearance of the electronic device, such as a background image on desktop, a lock screen, a brightness of the screen, etc. can be the same on the checked-out electronic device as they were on the checked-in electronic device.

In some embodiments, the user or the administrator can specify an image to be displayed on a screen (e.g., a lock-screen) of a checked-out electronic device. For example, an image preselected by the user (perhaps as indicated in the user database 210) can be displayed on the screen. This image can be a picture of the user. Having this image on the screen of the checked out electronic device can enable the user to find the electronic device when more than one electronic devices have been checked out at the same time.

Although it is assumed for the example in FIG. 4 that the user has a backup file available, in some embodiments, a backup file may not be available for the user. In this case, administrative electronic device 200 can check out an electronic device without updating the state of the electronic device using a backup file. For example, the electronic device can be checked-out to the user in the initial state, or as updated using only an administrator's file.

Note that, in some embodiments, administrative electronic device 200 can confirm that it has permission to perform a check-out and to use the user's backup file to update a state of the electronic device before doing so. More specifically, upon receiving the indication that the electronic device is to be checked out, administrative electronic device 200 may first confirm that administrative electronic device 200 is enabled (i.e., has permission) to use the backup file to update the state of the electronic device. This can comprise querying the electronic device or looking up permission information in device database 212. If administrative electronic device 200 does not have permission, the check-out operation may be terminated and a warning may be generated to the administrator (e.g., through the application running on administrative electronic device 200). Otherwise, administrative electronic device 200 can proceed with the check-out operation. In this way, an improper update of a non-approved, unknown, or otherwise incorrect electronic device can be avoided. In some embodiments, administrative electronic device 200 and electronic devices 202-206 can agree in advance on encryption to be used during the communication operations to enable the devices to determine if communication (and hence check-out) are allowed.

Using an Intermediate File

Recall that the described embodiments can use staging area 214 in administrative electronic device 200 to enable the use of partial backup files (interchangeably called "intermediate backup files") when checking in and checking out electronic devices to potentially avoid communicating large files between administrative electronic device 200 and electronic devices.

Figure 5:
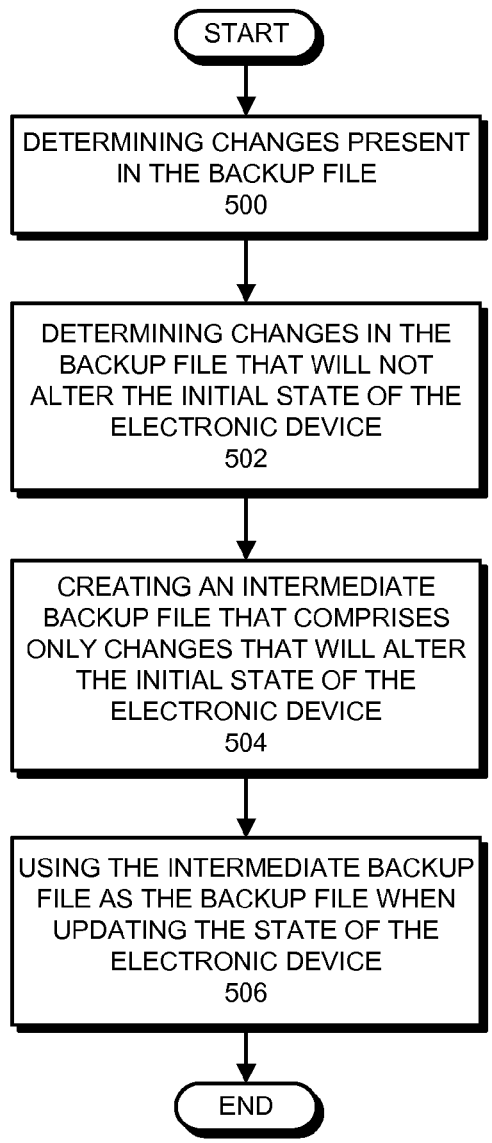
FIG. 5 presents a flowchart illustrating a process using a partial backup file in accordance with the described embodiments.

FIG. 5 presents a flowchart illustrating a process of checking out an electronic device using a partial backup file in accordance with the described embodiments. In describing the operations in FIG. 5, it is assumed that a user has a backup file present in user database 210, and that an initial state of the electronic device has been established and is known (e.g., an administrator's file can be checked to determine the initial state of the electronic device).

The process shown in FIG. 5 starts when administrative electronic device 200 determines changes present in a backup file for a user (step 500). For example, this can include determining settings, file, and applications changes in the backup file.

Administrative electronic device 200 then determines changes in the backup file that will not alter the initial state of the electronic device (step 502). For example, some or all of the files that will be placed on the electronic device when the backup file is restored may already be present on the electronic device in the initial condition. Additionally, the electronic device may already be configured with settings similar to the user's settings and/or may have appropriate applications installed.

Based on these determinations, administrative electronic device 200 creates an intermediate backup file that comprises only changes that will alter the initial state of the electronic device (step 504). This operation comprises creating an intermediate backup file (i.e., a file in the same basic format as the user's backup file), but with any unnecessary changes left out. Thus, documents, settings, and/or applications that will not change the initial state are not added to the intermediate backup file. Because these things are not added to the intermediate backup file, the intermediate backup file can be smaller (and perhaps much smaller) in size (e.g., number of bytes) than the user's backup file.

The administrative electronic device 200 then uses the intermediate backup file as the backup file when updating the state of the electronic device (step 506). Note, however, that the original backup file for the user can be retained in the staging area to be updated as is described in FIG. 6.

Figure 6:
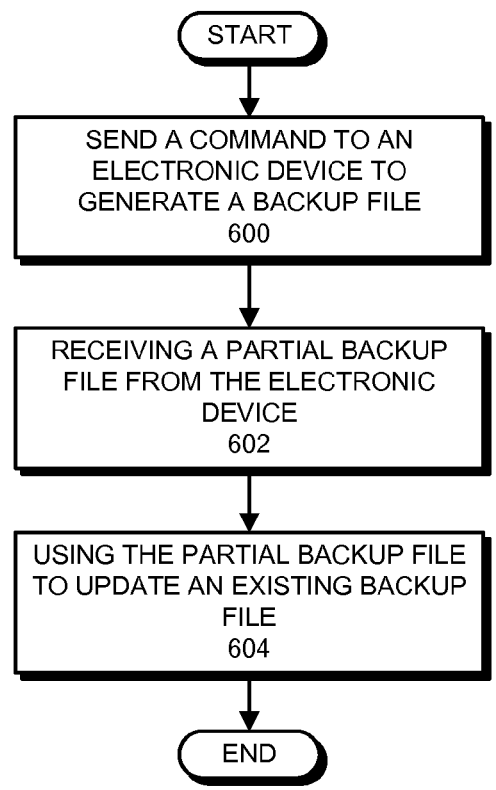
FIG. 6 presents a flowchart illustrating a process of using a partial backup file in accordance with the described embodiments.

FIG. 6 presents a flowchart illustrating a process of checking in an electronic device using a partial backup file in accordance with the described embodiments. In describing the operations in FIG. 6, it is assumed that a user has a backup file present in staging area 214, although this is not necessary.

The process shown in FIG. 6 starts when administrative electronic device 200 sends a command to an electronic device to generate a backup file (step 600). Upon receiving the command, the electronic device generates a partial backup file that comprises only changes that differ from a backup file for the user that is present in user database 210 in administrative electronic device 200. In some embodiments, the electronic device can include a list of changes that are already present in the backup file for the user that is present in user database 210 in administrative electronic device 200, and can use this list to determine what is to be added to (and left out of) the partial backup file. The electronic device then communicates the generated backup file to administrative electronic device 200.

Next, administrative electronic device 200 receives the partial backup file from the electronic device (step 604) and uses the partial backup file to update the existing backup file for the user in user database 210 in administrative electronic device 200 (step 606).

Access to Backup Files

In some embodiments, administrative electronic device 200 can provide/present some or all of the information in the backup files in user database 210 to a user using administrative electronic device 200. For example, if a backup file in user database 210 includes a word processing document, the user of administrative electronic device 200 may be able to acquire the word processing document from the backup file and use word processing software on administrative electronic device 200 to review the word processing document. In some embodiments, the administrator can also re-create the backup file, e.g., replacing an original version of a word processing document in the backup file with an edited version.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments.

What is claimed is:

1. A method for configuring an electronic device, comprising:
   in an administrative electronic device, performing operations for:
      receiving an indication that an electronic device that is presently checked out to a user is to be checked in;
      requesting a backup file with information from the electronic device, wherein the information comprises information about one or more changes made to the electronic device since the electronic device was checked out;
      receiving the backup file from the electronic device; and
      restoring the electronic device to an initial state, wherein, in the initial state, changes made to the electronic device since the electronic device was checked out are reversed to return the electronic device to the initial state.

2. The method of claim 1, wherein the method further comprises:
   in the administrative electronic device, performing operations for:
      storing the backup file in an entry in a user database; and
      updating the entry to indicate that the entry holds the backup file for the user.

3. The method of claim 2, wherein the method further comprises:
   in the administrative electronic device, performing operations for:
      receiving an indication that an electronic device is to be checked out to the user;
      checking out an electronic device in the initial state to the user;
      retrieving the backup file for the user from the user database; and
      using the backup file to update a state of the electronic device, wherein the updated state of the electronic device comprises the changes made to the electronic device.

4. The method of claim 3, wherein the method further comprises:
   in the administrative electronic device, performing operations for:
      acquiring an administrator's file, wherein the administrator's file comprises one or more changes to be made to the electronic device after the electronic device is checked out; and
      using the administrator's file update the backup file before using the backup file to update the state of the electronic device; or
      after using the backup file to update a state of the electronic device, using the administrator's file to again update the state of the electronic device.

5. The method of claim 4, wherein the method further comprises:

in the administrative electronic device, performing operations for:
receiving an indication that an electronic device is to be checked out to the user when no backup file exists for the user;
checking the electronic device out to the user; and
using the administrator's file to update a state of the electronic device.

6. The method of claim 3, wherein using the backup file to update a state of the electronic device comprises:
determining changes present in the backup file;
determining changes in the backup file that will not alter the initial state of the electronic device;
creating an intermediate backup file that comprises only changes that will alter the initial state of the electronic device; and
using the intermediate backup file as the backup file when updating a state of the electronic device.

7. The method of claim 6, wherein receiving the backup file from the electronic device comprises:
receiving a partial backup file from the electronic device, wherein the partial backup file comprises only changes made that are different than the changes in the intermediate file; and
updating the backup file with the changes from the partial backup file.

8. The method of claim 3, wherein the method further comprises, upon receiving an indication that an electronic device is to be checked out to the user, but before proceeding with checking out an electronic device to the user:
in the administrative electronic device, performing operations for:
determining if the electronic device is an electronic device that is in a set of electronic devices that are allowed to be checked out; and
if so, proceeding with checking out the electronic device, retrieving the backup file, and using the backup file to update a state of the electronic device;
otherwise, generating a warning and not proceeding with checking out the electronic device, retrieving the backup file, and using the backup file to update a state of the electronic device.

9. The method of claim 2, wherein the method further comprises:
in the administrative electronic device, performing operations for:
providing information from the backup file in the user database to one or more users for review.

10. The method of claim 1, wherein the one or more changes made to the electronic device since the electronic device was checked out comprise at least one of:
files added to the electronic device since the electronic device was checked out;
settings changed for the electronic device since the electronic device was checked out; and
applications installed on the electronic device since the electronic device was checked out.

11. The method of claim 1, wherein receiving an indication that an electronic device that is presently checked out to a user is to be checked in comprises:
receiving a connection event from a checked out electronic device; or
receiving an indication from a user that a checked out electronic device is to be checked in.

12. The method of claim 1, wherein restoring the electronic device to an initial state comprises:

receiving an indication of the initial state; and
using the received indication as a template of the initial state.

13. An administrative electronic device, comprising:
a processing subsystem in the administrative electronic device that is configured to perform operations for:
receiving an indication that an electronic device that is presently checked out to a user is to be checked in;
requesting a backup file with information from the electronic device, wherein the information comprises information about one or more changes made to the electronic device since the electronic device was checked out;
receiving the backup file from the electronic device; and
restoring the electronic device to an initial state, wherein, in the initial state, changes made to the electronic device since the electronic device was checked out are reversed to return the electronic device to the initial state.

14. The administrative electronic device of claim 13, wherein the processing subsystem is configured to perform operations for:
storing the backup file in an entry in a user database; and
updating the entry to indicate that the entry holds the backup file for the user.

15. The administrative electronic device of claim 14, wherein the processing subsystem is configured to perform operations for:
receiving an indication that an electronic device is to be checked out to the user;
checking out an electronic device in the initial state to the user;
retrieving the backup file for the user from the user database; and
using the backup file to update a state of the electronic device, wherein the updated state of the electronic device comprises the changes made to the electronic device.

16. The administrative electronic device of claim 15, wherein the processing subsystem is configured to perform operations for:
acquiring an administrator's file, wherein the administrator's file comprises one or more changes to be made to the electronic device after the electronic device is checked out; and
using the administrator's file update the backup file before using the backup file to update the state of the electronic device; or
after using the backup file to update a state of the electronic device, using the administrator's file to again update the state of the electronic device.

17. The administrative electronic device of claim 16, wherein the processing subsystem is configured to perform operations for:
receiving an indication that an electronic device is to be checked out to the user when no backup file exists for the user;
checking the electronic device out to the user; and
using the administrator's file to update a state of the electronic device.

18. The administrative electronic device of claim 15, wherein, when using the backup file to update a state of the electronic device, the processing subsystem is configured to perform operations for:
determining changes present in the backup file;
determining changes in the backup file that will not alter the initial state of the electronic device;

creating an intermediate backup file that comprises only changes that will alter the initial state of the electronic device; and using the intermediate backup file as the backup file when updating a state of the electronic device.

19. The administrative electronic device of claim 18, wherein, when receiving the backup file from the electronic device, the processing subsystem is configured to perform operations for:

receiving a partial backup file from the electronic device, wherein the partial backup file comprises only changes made that are different than the changes in the intermediate file; and updating the backup file with the changes from the partial backup file.

20. The administrative electronic device of claim 15, wherein, upon receiving an indication that an electronic device is to be checked out to the user, but before proceeding with checking out an electronic device to the user, the processing subsystem is configured to perform operations for:

determining if the electronic device is an electronic device that is in a set of electronic devices that are allowed to be checked out; and if so, proceeding with checking out the electronic device, retrieving the backup file, and using the backup file to update a state of the electronic device;

otherwise, generating a warning and not proceeding with checking out the electronic device, retrieving the backup file, and using the backup file to update a state of the electronic device.

21. The administrative electronic device of claim 14, wherein the processing subsystem is configured to perform operations for:

providing information from the backup file in the user database to one or more users for review.

22. The administrative electronic device of claim 13, wherein the one or more changes made to the electronic device since the electronic device was checked out comprise at least one of:

files added to the electronic device since the electronic device was checked out;

settings changed for the electronic device since the electronic device was checked out; and applications installed on the electronic device since the electronic device was checked out.

23. The administrative electronic device of claim 13, wherein, when receiving an indication that an electronic device that is presently checked out to a user is to be checked in, the processing subsystem is configured to perform operations for:

receiving a connection event from a checked out electronic device; or receiving an indication from a user that a checked out electronic device is to be checked in.

24. The administrative electronic device of claim 13, wherein, when restoring the electronic device to an initial state, the processing subsystem is configured to perform operations for:

receiving an indication of the initial state; and using the received indication as a template of the initial state.

25. A computer-readable storage medium containing instructions that, when executed by an administrative electronic device with computing capabilities, cause the administrative electronic device to perform a method for configuring an electronic device, comprising:

receiving an indication that an electronic device that is presently checked out to a user is to be checked in;

requesting a backup file with information from the electronic device, wherein the information comprises information about one or more changes made to the electronic device since the electronic device was checked out;

receiving the backup file from the electronic device; and restoring the electronic device to an initial state, wherein, in the initial state, changes made to the electronic device since the electronic device was checked out are reversed to return the electronic device to the initial state.

26. The computer-readable storage medium of claim 25, wherein the method further comprises:

storing the backup file in an entry in a user database; and updating the entry to indicate that the entry holds the backup file for the user.

27. The computer-readable storage medium of claim 26, wherein the method further comprises:

receiving an indication that an electronic device is to be checked out to the user;

checking out an electronic device in the initial state to the user;

retrieving the backup file for the user from the user database; and using the backup file to update a state of the electronic device, wherein the updated state of the electronic device comprises the changes made to the electronic device.

28. The computer-readable storage medium of claim 27, wherein the method further comprises:

acquiring an administrator's file, wherein the administrator's file comprises one or more changes to be made to the electronic device after the electronic device is checked out; and using the administrator's file update the backup file before using the backup file to update the state of the electronic device; or after using the backup file to update a state of the electronic device, using the administrator's file to again update the state of the electronic device.

29. The computer-readable storage medium of claim 28, wherein the method further comprises:

receiving an indication that an electronic device is to be checked out to the user when no backup file exists for the user;

checking the electronic device out to the user; and using the administrator's file to update a state of the electronic device.

30. The computer-readable storage medium of claim 27, wherein using the backup file to update a state of the electronic device comprises:

determining changes present in the backup file;

determining changes in the backup file that will not alter the initial state of the electronic device;

creating an intermediate backup file that comprises only changes that will alter the initial state of the electronic device; and using the intermediate backup file as the backup file when updating a state of the electronic device.

31. The computer-readable storage medium of claim 30, wherein receiving the backup file from the electronic device comprises:

receiving a partial backup file from the electronic device, wherein the partial backup file comprises only changes made that are different than the changes in the intermediate file; and updating the backup file with the changes from the partial backup file.

32. The computer-readable storage medium of claim 27, wherein the method further comprises, upon receiving an indication that an electronic device is to be checked out to the user, but before proceeding with checking out an electronic device to the user:
 determining if the electronic device is an electronic device that is in a set of electronic devices that are allowed to be checked out; and
 if so, proceeding with checking out the electronic device, retrieving the backup file, and using the backup file to update a state of the electronic device;
 otherwise, generating a warning and not proceeding with checking out the electronic device, retrieving the backup file, and using the backup file to update a state of the electronic device.

33. The computer-readable storage medium of claim 26, wherein the method further comprises:
 providing information from the backup file in the user database to one or more users for review.

34. The computer-readable storage medium of claim 25, wherein the one or more changes made to the electronic device since the electronic device was checked out comprise at least one of:
 files added to the electronic device since the electronic device was checked out;
 settings changed for the electronic device since the electronic device was checked out; and
 applications installed on the electronic device since the electronic device was checked out.

35. The computer-readable storage medium of claim 25, wherein receiving an indication that an electronic device that is presently checked out to a user is to be checked in comprises:
 receiving a connection event from a checked out electronic device; or
 receiving an indication from a user that a checked out electronic device is to be checked in.

36. The computer-readable storage medium of claim 25, wherein restoring the electronic device to an initial state comprises:
 receiving an indication of the initial state; and
 using the received indication as a template of the initial state.

37. An electronic device, comprising:
 a processing subsystem in the electronic device that is configured to perform operations for:
  sending an indication to an administrative electronic device that the electronic device, which is presently checked out to a user, is to be checked in;
  receiving a request for a backup file with information from the electronic device from the administrative electronic device, wherein the information comprises information about one or more changes made to the electronic device since the electronic device was checked out;
  sending the backup file to the administrative electronic device; and
  receiving commands from the administrative electronic device that restore the electronic device to an initial state, wherein, in the initial state, changes made to the electronic device since the electronic device was checked out are reversed to return the electronic device to the initial state.

38. The electronic device of claim 37, wherein, before sending an indication to an administrative electronic device that the electronic device, which is presently checked out to a user, is to be checked in, the processing subsystem is configured to perform operations for:
 sending an indication to the administrative electronic device that the electronic device is to be checked out to the user; and
 receiving commands from the administrative electronic device that restore the electronic device to an updated state based on an administrator's file when no backup file exists for the user.

39. The electronic device of claim 37, wherein the processing subsystem is configured to perform operations for:
 sending an indication to the administrative electronic device that the electronic device is to be checked out to the user; and
 receiving commands from the administrative electronic device that restore the electronic device to an updated state that includes the changes made to the electronic device, wherein the commands are configured based on information regarding the changes made to the electronic device from the backup file.

40. The electronic device of claim 39, wherein, when receiving commands from the administrative electronic device that restore the electronic device to an updated state, the processing subsystem is configured to perform operations for:
 receiving commands based on an intermediate backup file, wherein the intermediate backup file includes only changes from the backup file that will alter the initial state of the electronic device.

41. The electronic device of claim 40, wherein, when sending the backup file to the administrative electronic device, the processing subsystem is configured to perform operations for:
 sending a partial backup file, wherein the partial backup file comprises only changes made that are different than the changes in the intermediate file.

42. The electronic device of claim 37, wherein the one or more changes made to the electronic device since the electronic device was checked out comprise at least one of:
 files added to the electronic device since the electronic device was checked out;
 settings changed for the electronic device since the electronic device was checked out; and
 applications installed on the electronic device since the electronic device was checked out.

* * * * *